United States Patent [19]

Krieg

[11] 4,216,945
[45] Aug. 12, 1980

[54] APPARATUS FOR AUTOMATICALLY CONTROLLING THE CUTTING OF PIPES, PLATES AND THE LIKE

[75] Inventor: Adrian H. Krieg, Yorktown, N.Y.

[73] Assignee: Widder Corporation, Naugatuck, Conn.

[21] Appl. No.: 4,882

[22] Filed: Jan. 19, 1979

Related U.S. Application Data

[63] Continuation of Ser. No. 702,077, Jul. 2, 1976, abandoned.

[51] Int. Cl.² ........................ B23K 7/04; B23K 7/10
[52] U.S. Cl. .............................. 266/56; 219/124.33; 266/58; 266/60
[58] Field of Search ............... 148/9.6; 219/124.33, 219/125.1, 125.11, 125.12; 228/102, 7; 266/54, 56, 57, 58, 59, 60, 61; 318/567, 568, 569, 575

[56] References Cited

U.S. PATENT DOCUMENTS

| 2,876,650 | 3/1959 | Sangster | 408/3 X |
| 3,555,239 | 1/1971 | Kerth | 266/58 X |

Primary Examiner—Paul A. Bell

[57] ABSTRACT

An automatic control means is provided with a pipe cutting and welding apparatus. The control means has a computer which controls the operation of the motors operating the main carriage, the tool heads, and the bracket arms for cutting or welding pipes, plates or the like.

11 Claims, 6 Drawing Figures

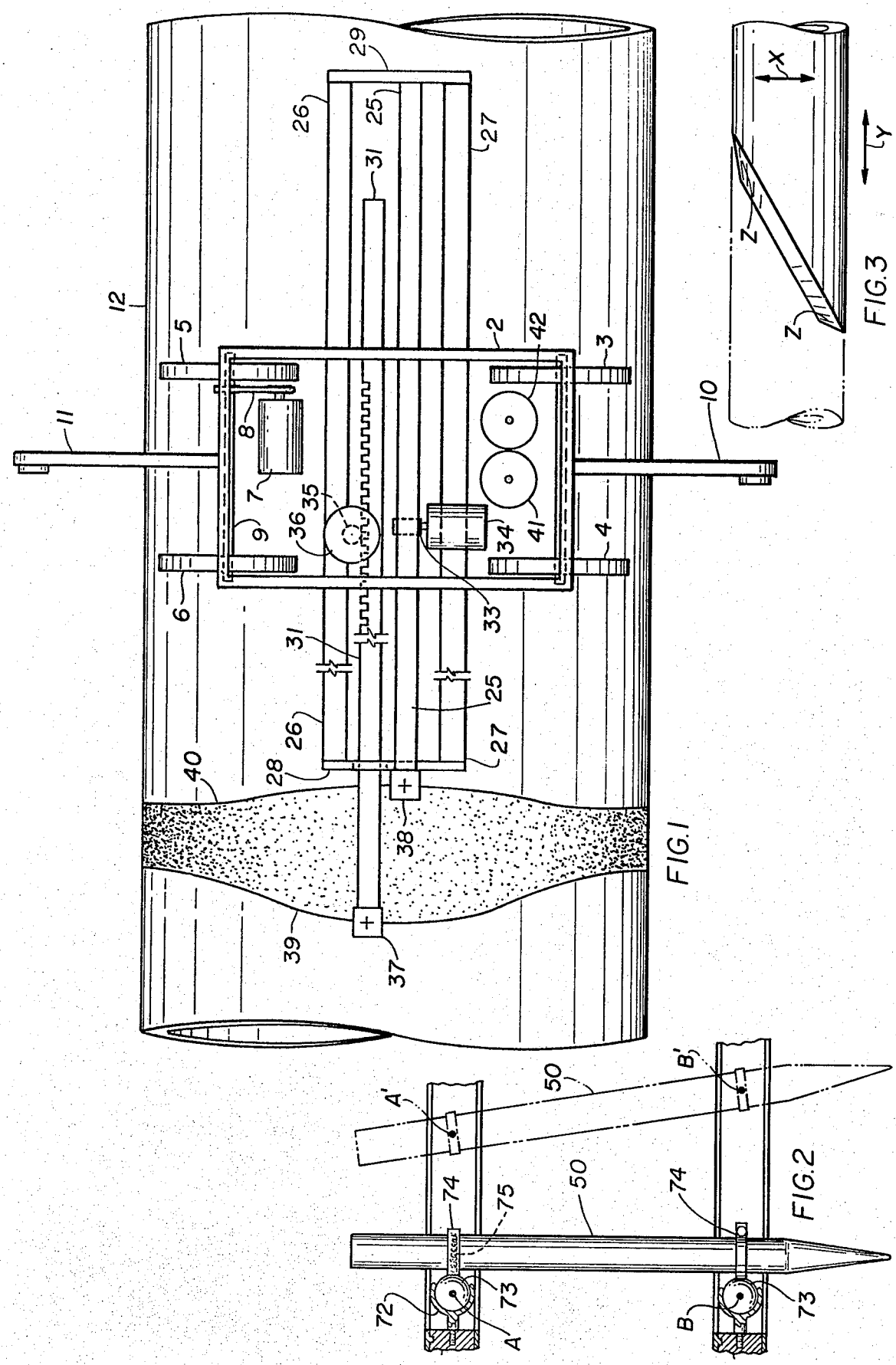

APPARATUS FOR AUTOMATICALLY CONTROLLING THE CUTTING OF PIPES, PLATES AND THE LIKE

This is a continuation of Ser. No. 702,077, filed July 2, 1976, now abandoned.

Reference is had to applicant's copending application Ser. No. 614,431, filed Sept. 18, 1975, now U.S. Pat. No. 4,143,862 the disclosure of which is incorporated herein.

BACKGROUND OF THE INVENTION

In applicant's copending application Ser. No. 614,431, filed Sept. 18, 1975, an apparatus for cutting pipes, plates, and the like and for the welding same has been disclosed. In said application, the control of the carriage along a pipe or the like, the control of the rotation of the tool head, and the control of the longitudinal movement of the tool head relative to the carriage was achieved by means of a pair of profile curves placed on the pipe which were detected by an optical system which controlled the motors for the rotation of the tool head and the longitudinal movement of a pair of bracket arms to which is mounted the tool head. By the proper choice of profile curves, the particular angular attack of the tool head and the particular angle of cut of the pipe desired was attainable.

SUMMARY OF THE INVENTION

It is the object of the present invention to provide an automatic control means for the apparatus disclosed in applicant's copending application Ser. No. 614,431, which control means is substitutable for the optical scanning system disclosed in said copending application.

The automatic control means is made up of a computer or calculator which is preprogrammed with a given parametric formulae corresponding to the various mode of operations of the apparatus to which the several variable functions dealing with the dimensions of the workpiece, shape and form of the work to be performed as well as speed at which it is to be performed can be entered. The control has a plurality of vertical rows of buttons corresponding to the number of variable functions and additional vertical rows of buttons corresponding to those preprogrammed parameters necessary to the control of the apparatus when being used in specific environments, as for cutting a pipe for mating engagement with another pipe at right angles to the cut pipe.

The control means is mounted in a main panel which has a first interconnect switch for connecting the output of the calculator to the motors controlling the rotation of the carriage about the pipe and the motor controlling the longitudinal movement of the bracket arms mounting the tool head. A second main interconnect switch is also provided on the control panel for connecting the calculator with all of the motors of the apparatus to thereby control the operation of all of the motors during the cutting or welding operation.

The control panel is further provided with a first and second rheostat for controlling the speed of the motors for driving the carriage and for moving the bracket arms. A third and fourth rheostat are also provided for controlling the speed of the pair of motors controlling the orientation and rotation of the tool head relative to the bracket arms.

BRIEF DESCRIPTION OF THE DRAWINGS

The invention will more readily understood with reference to the following detailed description when taken in conjunction with the accompanying drawings, wherein FIG. 1 illustrates the pipe cutting and welding apparatus of applicant's copending application for use in cutting a pipe;

FIG. 2 is an enlarged view of the torch or welding head employed in the apparatus of FIG. 1;

FIG. 3 is a schematic view of a pipe showing an illustrative example for cutting the same at a particular point, angle and bevel;

DETAILED DESCRIPTION OF THE INVENTION

Figure 4:
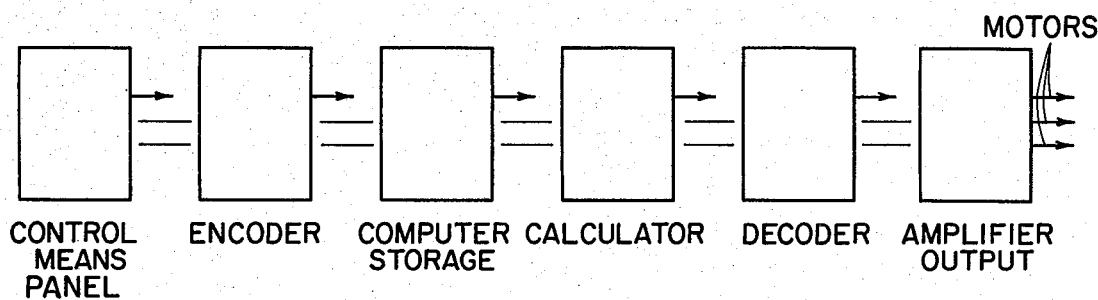
FIG. 4 is a schematic diagram of a logic circuit of the control computer.

The present invention has application in all of the work operations disclosed in applicant's earlier mentioned application Ser. No. 614,431, as well as in many additional related operations. Since however, the cutting of pipe represent an operation which includes a consideration of all the parameters necessary it is chosen here as the illustrative example. It will be recognized that from the following discussion extrapolation into other work operations can be easily made.

Therefore, as seen in FIG. 1, the cutting and welding apparatus of applicant's copending application comprises a main carriage 2 mounted on a plurality of wheels 3, 4, 5 and 6 so as to be rotatable about a pipe 12. Extending from the carriage are opposed arms 10 and 11 to which means are attached for holding the carriage to the pipe, which it rotates thereabout. The carriage 2 supports for axial slidable movement therein bracket arms 26 and 27 which has mounted at the ends thereof for conjoint movement the plate 29 on which is mounted the torch head or welding head, 50 seen in FIG. 2. Mounted within the carriage 2 is a motor 7 and transmission 8 for causing the rotation of the carriage about the pipe. Also mounted within the carriage is a motor 34 which controls the longitudinal movement of the arm 25 and thus of the torch or welding head. A pair of motors 41 and 42 are further mounted in the carriage, connected by cable or the like to the swivel mountings 73, 74 on which the torch or welding head is mounted, so that its angular orientation to the surface of the pipe can be changed. The operation of the apparatus of the prior disclosure depends upon a guidance system similar to that employing a template or the like, provided by profile curves 39 and 40 drawn or placed directly on the workpiece. The longitudinal slidable arm 31 has mounted at the rear end a photo-senser 37 and a similar photo-sensor 38, mounted on the end of a second arm 25. The sensors 37 and 38 sense, respectively arcuate edges of the profile curves which are translated into power control signals for each of the motors 7, 34, 41 and 42 resulting in a desired axial and transverse movement of the torch or welding head, and the desired angle of cut. Motor 7 may be independently controlled since the operation of motors 34, 41 and 42 can be made as a function thereof.

According to the present invention, it is desired to establish an automatic computerized method and system for controlling the operation of the torch head, so that workpieces may be worked, ie: cut, welded, seamed, or the like in virtually any shape, and in which the program for any shape may be pre-set and pre-recorded so that field operators may employ the apparatus with a minimum of effort, calculation and manual attendance, all without the use or need of the cumbersome template and photo-sensor systems.

As seen in FIG. 3, the work operation for cutting a pipe, (and for that matter any workpiece) involves movement of the torch head in three directions; X, Y and Z; Y being defined as movement axially along the workpiece, (translated into operation of motor 34); X being defined as movement transversely of the workpiece (translated into operation of motor 7) and Z being defined as the angular cut or bevel through the workpiece (translated into operation of motors 41 and 42 relative to each other). For all practical purposes, the directional movements X and Y may be viewed as taking place in a common plane since the bracket arms 26 and 27 reciprocate linearly along a horizontal axis within the main carriage 2. Furthermore, because the main carriage moves over the workpiece while resting on the surface of the workpiece (irrespective of the curvature of the workpiece) the plane in which the X and Y axes occur (also irrespective of its curvature) is parallel to the surface of the workpiece. Thus, the torch head may be viewed moving through a series of rectangular coordinate points, during which the torch head maintains a fixed distance from the surface of the workpiece and an angular orientation dependent upon the relative movement of the motors 41 and 42.

The foregoing gives rise to a unique procedure for forming any shape, or form on the workpiece, with or without an angular bevel cut. Firstly, all overall shape of the object, for example, a cut or hole can be formed in the workpiece merely by employing simple and well known analytical geometric formulae rectalinear coordinates. Thus for example, if a straight or $y - b = m(x - a)$, (where the intersection is at a,b) line is to be cut in the workpiece for formulae $y = mx + k$, may be employed, which permits linear movement in the Y axis for increment in the X axis. If a circle is desired, the general formulae $(x - a)^2 + (y - b)^2 = c^2$ may be employed where the coordinates a, b defines the center and c defines the radius of the circle. Similarly, an ellipse may be plotted in rectangular coordinates by the formulae $x^2/a^2 + y^2/b^2 = 1$. While circles, ellipses and straight lines are most often employed in pipe joining, plate welding etc., it will be obvious that other shapes, including scrolls, gear shapes, stars. etc., can be worked by choosing the appropriate mathematical formulae in rectalinear coordinages.

The bevelled edge of the worked shape, that is, the angular disposition of the material between the upper and lower surfaces of the workpiece is formed by swivelling of the torch or work head in the Z axis. It is interesting to note, that contrary to what might be expected at first glance, the depth of the bevel cut, i.e. the thickness of the workpiece, in most instances is of no significance, since in both planar workpieces, curved workpieces such as pipes, or even solids, the outer and inner surfaces are parallel, thereby the angle made with the upper surface is identical with that of the lower surface. Only where the bevel is to be cusped or curved (as a practical matter in virtually no commercial case) would the depth be of significant.

Consequently, since the torch head maintains a fixed distance from the surface of the workpiece and in accordance with the structure shown inherently swivels about a fixed central point the movement of the torch head may be translated into mathematical formula. For example, if a circular hole is to be formed in the workpiece having a defined bevelled edge, a right conic polar equation, such as $r = 2_c \cos(\theta - a)$ where the center is at c, a and the origin on the circumference may be employed. Should a straight line bevel cut be required a simple linear formula maintaining the torch head 50 at a constant angle with the surface of the workpiece may also be used. In such a formula the directrix of the cone will describe a uniform angle with respect to the surface of the workpiece which is the supplement of the focus angle, about the entire shape of the hole. It is well to remember, that the conic projection may be viewed independently of the overall shape of the opening or hole being formed, since as explained earlier, the workpiece presents what is in effect a flat planar surface to the torch or work head, since the torch moves in the X and Y axes in parallel plane thereto. Nevertheless, the movements of the carriage, arm, torch head, etc., can be integrated by well known technology, so that all the movements occur simultaneously and/or in relative sequence.

The foregoing formulae, are given by way of example only. It will be appreciated clearly that any shape or form can be translated into such a formulation, even complex shapes such as gearings, dovetails, keys, etc. In general, for pipe cutting, pipe joining and similar uses as herein described, the use of common formulations for circles, ellipses, parabolic and hyperbolic sections will most frequently be used, and reference to standard mathematical texts can be made.

Generally, as seen in FIG. 4, the system comprises a series of modules such as an input control panel, an encoder unit, a computer storage or memory device, integrator calculator and a discriminator or decoder, and a signal amplifier and output unit. The storage module may be pre-supplied with a plurality of given programs, in the form of the mathematical formula previously mentioned, as well as with interchangeable storage systems so that special programs may be stored as desired. The variable parametric functions comprising the input for the program are contained in a plurality of variable control mechanisms in the control panel. The encoder, interposed between the control panel and the computer, translates the input signal into the binary or magnetic code required for application to the stored program. The computer storage feeds to a calculator which determines the signals necessary for each of the integrated operational motors which then feeds to the decoder, separating the signal which passes through the amplifier output directly to the individual motors.

With the use of the foregoing system the basic apparatus of the earlier copending application may be simplified further from that described earlier. Particularly, the photo-sensors and template devices can be eliminated and direct control of the motors and operation of the device can be made from the computer. Furthermore, the present system, being no longer dependent on finite template structures is capable of greater accuracy and capable of providing more complex cuts, workings and weldings than heretofore known. Except for the omission of the templates, photo-sensor and directly related equipment, the device as heretofore described need not be changed.

Figure 5:
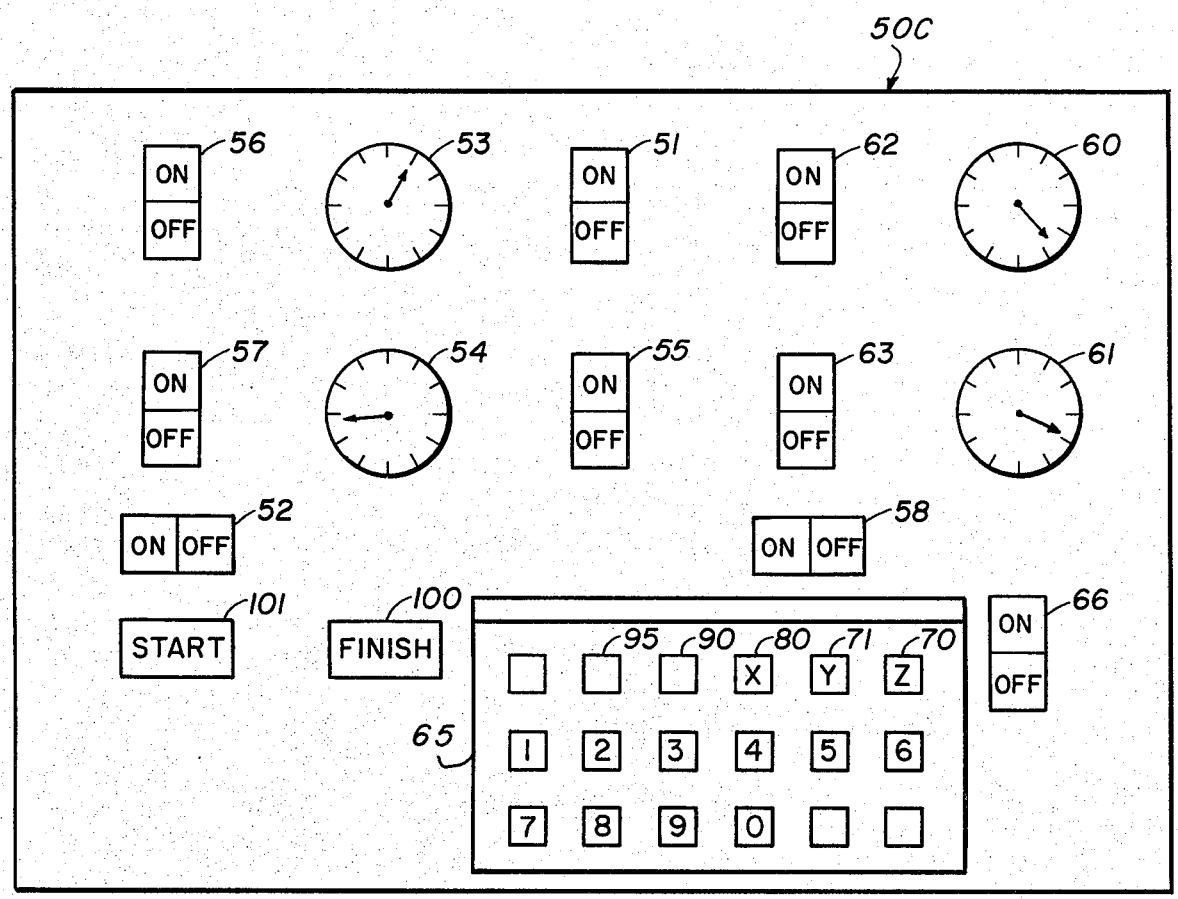
FIG. 5 shows the control means of the present invention for controlling the operation of the apparatus.
Figure 6:
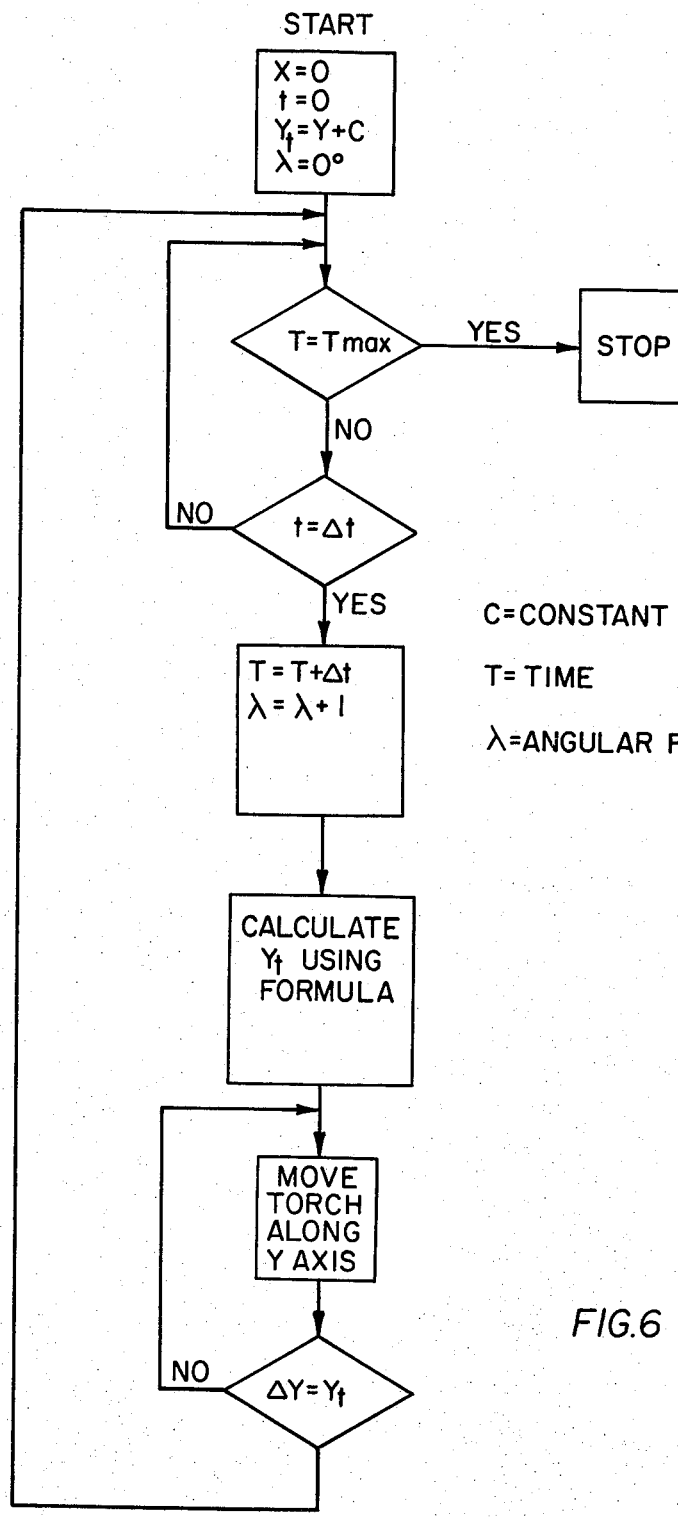
FIG. 6 is a logic diagram illustrating the progress of operation.

In FIGS. 5 and 6, specific components and modes of operation are detailed as exemplary of the control panel and operation which requires manual setting, as to the other components of the system, such as the storage, calculator, decoders etc., they may be selectively chosen from commercially available modules, such as those described in well known texts, as for example, the TTL Applications Handbook, of Fairchild Semiconductor Company, 464 Ellis St., Mountain View, Calif. 94042. Those skilled in the machine tool art will readily find other equivalent sources for such units.

Referring now to FIG. 5 the control means of the present invention is disclosed and referred to generally by reference character 50C. The control means 50C is made up of a control panel having a main power switch 51 for the control of the on and off position of the apparatus, and a X-Y Interconnect switch 52 for selectively placing the apparatus in a mode by which power is only directed to the motors 7 and 34, those motors controlling the rotation of the carriage about the pipe and the movement of the torch or welding head longitudinally relative to the carriage. This mode of operation of the apparatus would be used when the torch head is not rotatable but held constant so as to achieve a constant angle of bevel cut or weld. A rheostat, or the like, 53 and a rheostat 54 control respectively the angular speed of the carriage about the pipe and the speed of longitudinal movement of the arm brackets 26,27. Rheostates 53 and 54 are associated with on-off switches 55,56, respectively, for the supplying of power thereto.

A main interconnect switch 57 is also provided, which switch serves to place the apparatus in a mode that controls all of the aspects of the device. Such a mode will in addition to controlling the movement of the carriage about the pipe and the longitudinal movement of the bracket arms 26,27, but also the rotation of the torch or welding head. The control the speed of rotation of the torchhead or welding head is accomplished by head rotation rheostats 60, 61 which control the top and bottom motors, respectively, of the torch or welding head. On-off switches 62, 63 selectively control the power to these rheostats. Of course, the rheostats may be replaced with silicon controlled rectifiers (SCR).

Mounted within the control panel is the computer system illustrated in FIG. 4, of which the manual input panel 65, is shown. Upon the inputting of relevant data, the system will automatically orient the apparatus to the desired position, thereby achieving the desired angle of cut and the desired angle of bevel cut in the case of the apparatus being used as a cutting device, or the equivalent when the apparatus is used as a welding device. The input panel 65 has associated therewith an on-off switch 66 which connects it to the rest of the system.

The computer is provided on the face of the panel with several buttons indicating various preprogrammed functional modes to be chosen and the inputs to be programmed therein. As indicated, the computer is capable of being preprogrammed in various parametric functions and logic modes or operations, and in general, the manual inputs relate to the choice of such preprogrammed modes and the specific angular disposition, speed and length of operation to be inserted therein. Thus the button panel is provided with a button 70 designed to actuate for example, the angular disposition of the torch head for determining the bevel; button 71 for choosing the preprogrammed function of travel in the axial direction; button 80 for the angular disposition of the arms 26, 27 that is the integrated movement in the transverse axis; button 90 relating to the diametric size of the workpiece and 95 relating to the size of the interlock workpiece or hole to be formed. Other parametric or preprogrammed functional logic modes may be stored in the computer may be connected to other buttons, not illustrated.

Below the preprogram choice buttons, the panel controls a series of digit buttons 1-10 by which the exact numbers may be inserted. Buttons indicating angles, radians, etc., may also be included. A manual jogging switch 58 is also employed to move the apparatus stepwise, if desired.

All of the elements thus described are conventional in design and readily available on the market, and are interconnected by suitable leads, and circuitry as are well known. The source of power for the motors, switches, relays and the like are conventional.

The computer 65 is programmed so that upon the reading in of a maximum to five parameters the control of the apparatus is obtained. FIG. 6 illustrates such a program and its operation. The mode of operation of the apparatus requires that all the control motors be continually controlled, as when a pipe is being cut that varies during the cutting operation, due to change in altitude of the carriage and its position on the workpiece. If on the other hand, the angle of bevel cut were constant, then the continual control of the motors driving the torch or welding head need not be continually monitored thereby necessitating the inputting into the computer less than the maximum of five parameters.

FIRST MODE OF OPERATION

In the case where a flat sheet of metal is being cut at a constant angle of bevel of 30 degrees, the bracket arms 26,27 are held in fixed position and therefore need not be controlled. All that is done is the pressing of the button 70 which corresponds to the function of setting up the orientation of the torch or welding head and the pressing of the button vertically below corresponding to 30 degrees. This reading in, coming after the turning on of switches 51,66,62,63 and 55 will set the torch or welding head at 30 degrees orientation. After pressing in the 30 degrees, the button 71 is pressed which corresponds to the function of setting up the direction of movement of the carriage. In this example, the 0 degrees button would be pressed after the pressing of the button 71, the 0 degree button being positioned vertically below the button 71.

SECOND MODE OF OPERATION

In this mode of operation, as for example when cutting at an angle a pipe with a constant angle of bevel cut, the bracket arms 26,27 must continually moved to achieve the proper angle of cut. For example, if an angle of cut desired were 30 degrees, and the desired angle of bevel cut were 37.5 degrees, these numbers must be read into the computer. As a first step, the switches 51,57, 55, 56, 62, 63 and 58 must be initially pressed to set up the proper functioning of the apparatus, the pressing of these buttons making the apparatus responsive to the reading in of three numbers corresponding to the desired cut. $A^S$ in the first mode, buttons 70 and 71 would be pressed with the pressing buttons therebelow corresponding to 90 degrees and 37.5 degrees, respectively. In addition, the button 80 corresponding to the function of setting up the orientation of the bracket arms 26,27 is pressed with the subsequent pressing of the button corresponding to 30 degrees positioned therebelow.

THIRD MODE OF OPERATION

In this mode, a pipe is to be cut for fitting into a hole formed into another pipe, the fitting being achieved at any angle. For example, if the pipe being cut has an outer diameter of 8 inches, the pipe receiving the cut pipe has an outer diameter of 10 inches, and the angle of bevel cut is 37.5 degrees, the steps carried out in the second mode of operation are again followed with the additional steps of pressing the button 90 corresponding to the function of setting up the size of the outer diameter of the pipe being cut along with the subsequent pressing of the button therebelow corresponding to 8 inches. After this step, the button 95 is pressed which corresponding to the function of setting up the size of the outer diameter receiving the cut pipe which is followed by the pressing of the button positioned therebelow corresponding of 10 inches.

In all of the above modes of operation, the computer may be supplied with a memory function so that the data is first inputted into the computer and then after such reading in the switches corresponding to the operations used in the operation are switched to the "on" position. If no memory is provided in the computer, a time delay may be provided so that the operation of all of the elements of the apparatus are commenced simultaneously.

The control panel may also have a "Finish" button 100 and a "Start" button 101 which may be used in place of the time delay.

The control means of the present invention is comprised of elements well-known in the art and of conventional design, which are readily purchaseable on the market.

What is claimed:

1. Apparatus for cutting, welding or otherwise working pipe, sheet, plate or similar workpiece comprising a carriage movable in the first axis parallel to the surface of said workpiece, a motor for driving said carriage, bracket means mounted on said carriage for reciprocal movement in a second axis angular to the first axis and parallel to the surface of said workpiece, a second motor for driving said bracket means, a tool, means for mounting said tool on said bracket means comprising a pair of spaced rotatable rings with a third axis perpendicular to said first and second axes, said tool being mounted by universally movable fastening means to each of said rings, motor means for individually rotating said rings about said third axis, control means for simultaneously operating the individual motor means to cause said tool to work said workpiece along a combined selected path parallel to the surface, said selected path being the function of a mathematical formula in terms of the coordinate paths of the first and second axes having fixed parametric values, said control means comprising a computer for storing a plurality of mathematical formulae having variable parameters for the coordinate paths of said first and second axis, variable parameters relating to the rotation of each ring, whereby the angle of attack of said work tool relative to said third axis may be varied, manually operable input means including means for selecting one of said mathematical formulae and means for inducing in said selected formulae predetermined values for said variable parameters, and output means including a calculator responsive to said computer for providing a resultant output of given value for each said coordinate paths and means for converting said resultant output to electrical signals for operating the respective motor means for said carriage and bracket.

2. The apparatus according to claim 1, said computer including means for integrating the mathematical formulae corresponding to the movement of said tool relative to the third axis with the mathematical formula for moving said carriage and said bracket.

3. The apparatus according to claim 1, said computer including means for separately storing the mathematical formulae corresponding to the movement of said tool relative to the third axis and the mathematical formula for moving said carriage and said bracket.

4. The apparatus according to claim 1, wherein said input means includes means for varying the speed of said motors in response to the output signal.

5. The apparatus according to claim 1, wherein said input means includes rheostats for controlling the speed of said motor means.

6. The apparatus according to claim 1, wherein said tool head comprises a torch head.

7. The apparatus according to claim 1, wherein said tool head comprises a welding head.

8. The apparatus according to claim 1, wherein said control means includes means for selectively connecting said output means to said motor means comprising a first interconnect switch connecting said output means to the respective motor means for said carriage and bracket means and a second interconnect switch selectively connecting said output means to the motor means for said carriage, bracket means and tool head.

9. The apparatus according to claim 8, wherein said manually operable input means comprises a panel having a plurality of vertical rows of buttons corresponding to the number of functions of the apparatus to be controlled.

10. The apparatus according to claim 9, wherein said panel further includes additional vertical rows of buttons corresponding to the parametric values necessary for the proper operation of the motor means.

11. The apparatus according to claim 8, wherein said control means include a time delay for delaying the output to the motor means until power to said motor means is supplied.

* * * * *